(12) United States Patent
Blohowiak et al.

(10) Patent No.: US 11,481,095 B2
(45) Date of Patent: *Oct. 25, 2022

(54) SYSTEMS AND METHODS FOR AUTOMATIC FORMATTING OF IMAGES FOR MEDIA ASSETS BASED ON USER PROFILE

(71) Applicant: Rovi Guides, Inc., San Jose, CA (US)

(72) Inventors: Aaron Peter Blohowiak, Belmont, CA (US); Walter R. Klappert, North Hollywood, CA (US); Michael R. Nichols, La Canada Flintridge, CA (US); Olivier Chalouhi, Mountain View, CA (US)

(73) Assignee: ROVl GUIDES, INC., San Jose, CA (US)

(*) Notice: Subject to any disclaimer, the term of this patent is extended or adjusted under 35 U.S.C. 154(b) by 35 days.

This patent is subject to a terminal disclaimer.

(21) Appl. No.: 16/816,094

(22) Filed: Mar. 11, 2020

(65) Prior Publication Data

US 2020/0264761 A1 Aug. 20, 2020

Related U.S. Application Data

(63) Continuation of application No. 14/752,031, filed on Jun. 26, 2015, now Pat. No. 10,628,009.

(51) Int. Cl.
*H04L 7/08* (2006.01)
*H04N 7/16* (2011.01)
(Continued)

(52) U.S. Cl.
CPC ........ *G06F 3/04845* (2013.01); *G06F 3/0481* (2013.01); *G06F 3/04842* (2013.01);
(Continued)

(58) Field of Classification Search
None
See application file for complete search history.

(56) References Cited

U.S. PATENT DOCUMENTS 5,850,352 A 12/1998 Moezzi et al.
7,334,249 B1 2/2008 Byers
(Continued)

FOREIGN PATENT DOCUMENTS

CN 102637255 A 8/2012
CN 102822817 12/2012
(Continued)

OTHER PUBLICATIONS

International Search Report and Written Opinion for PCT/US2016/038897 dated Sep. 12, 2016.
(Continued)

*Primary Examiner* — Kyu Chae
(74) *Attorney, Agent, or Firm* — Haley Guiliano LLP

(57) ABSTRACT

Systems and methods are provided herein for personalizing images that correspond to a media asset identifier by using user profile information. As an example, the television series "Community" has several actors, such as Joel McHale, Chevy Chase, and Ken Jeong. Poster art developed by an editor o50533238_1f "Community" may include an image that portrays each of Joel McHale, Chevy Chase, and Ken Jeong. In order to personalize the image, control circuitry may determine which actor(s) the user prefers, and crop out only those actors in the poster art to create a personalized image. As an example, if the user prefers Joel McHale, control circuitry may crop out the portrayal of Joel McHale and use only that portion of the image to display next to other text describing "Community."

12 Claims, 6 Drawing Sheets

(51) Int. Cl.
| | |
|---|---|
| *H04N 7/10* | (2006.01) |
| *H04N 7/025* | (2006.01) |
| *G06F 3/00* | (2006.01) |
| *G06F 3/04845* | (2022.01) |
| *G06F 3/04842* | (2022.01) |
| *G06F 3/14* | (2006.01) |
| *G06F 3/0481* | (2022.01) |
| *G06T 11/60* | (2006.01) |
| *G09G 5/00* | (2006.01) |
| *G06F 16/78* | (2019.01) |
| *G09G 5/14* | (2006.01) |
| *G06K 9/00* | (2022.01) |

(52) U.S. Cl.
CPC .............. *G06F 3/14* (2013.01); *G06F 3/1415* (2013.01); *G06F 16/78* (2019.01); *G06T 11/60* (2013.01); *G09G 5/003* (2013.01); *G09G 5/14* (2013.01); *G06T 2210/22* (2013.01); *G09G 2320/08* (2013.01)

(56) References Cited

U.S. PATENT DOCUMENTS

| | | | |
|---|---|---|---|
| 7,916,894 B1 * | 3/2011 | Dhillon | G06F 16/739 382/103 |
| 8,023,702 B2 | 9/2011 | Kohei | |
| 8,594,488 B1 | 11/2013 | Grundmann | |
| 9,591,359 B2 | 3/2017 | Blohowiak | |
| 10,628,009 B2 * | 4/2020 | Blohowiak | G06F 3/04845 |
| 2002/0174430 A1 | 2/2002 | Ellis | |
| 2002/0083091 A1 | 6/2002 | Pulier et al. | |
| 2003/0110499 A1 | 1/2003 | Knudson | |
| 2003/0051256 A1 | 3/2003 | Uesaki | |
| 2004/0059705 A1 | 3/2004 | Wittke et al. | |
| 2005/0166224 A1 | 7/2005 | Ficco | |
| 2005/0251827 A1 | 7/2005 | Ellis | |
| 2006/0044446 A1 | 3/2006 | Porter et al. | |
| 2007/0172155 A1 | 7/2007 | Guckenberger | |
| 2008/0313233 A1 | 12/2008 | Cohen et al. | |
| 2009/0049467 A1 | 2/2009 | Robson et al. | |
| 2009/0066784 A1 | 3/2009 | Stone et al. | |
| 2009/0106699 A1 | 4/2009 | Kihara | |
| 2010/0153885 A1 | 6/2010 | Yates | |
| 2011/0131241 A1 | 6/2011 | Petrou et al. | |
| 2011/0160886 A1 | 6/2011 | Lee et al. | |
| 2011/0225610 A1 | 9/2011 | Prieto | |
| 2011/0321096 A1 | 12/2011 | Landow et al. | |
| 2012/0213493 A1 | 8/2012 | Luo et al. | |
| 2012/0218297 A1 | 8/2012 | Ur | |
| 2012/0308192 A1 | 12/2012 | Chung | |
| 2013/0016128 A1 | 1/2013 | Bhatt | |
| 2013/0063561 A1 | 3/2013 | Stephan | |
| 2013/0254825 A1 | 9/2013 | Mishra | |
| 2013/0268306 A1 | 10/2013 | Tai | |
| 2014/0164365 A1 * | 6/2014 | Graham | G06Q 50/01 707/723 |
| 2014/0172881 A1 | 6/2014 | Petrou et al. | |
| 2014/0282660 A1 | 9/2014 | Oztaskent | |
| 2015/0213305 A1 * | 7/2015 | Sundstrom | H04N 5/23218 382/118 |
| 2015/0264416 A1 | 9/2015 | Heinz et al. | |
| 2015/0304521 A1 * | 10/2015 | Campanelli | G06K 15/1889 358/1.18 |
| 2015/0326892 A1 | 11/2015 | McCoy et al. | |
| 2016/0035347 A1 | 2/2016 | Agarwal et al. | |
| 2016/0092447 A1 | 3/2016 | Venkataraman et al. | |
| 2016/0094889 A1 | 3/2016 | Venkataraman et al. | |
| 2016/0100110 A1 | 4/2016 | Mate et al. | |
| 2016/0119488 A1 | 4/2016 | Chen et al. | |
| 2016/0179796 A1 | 6/2016 | Agarwal | |
| 2016/0378307 A1 | 12/2016 | Blohowiak | |
| 2016/0378308 A1 | 12/2016 | Blohowiak | |
| 2016/0381420 A1 | 12/2016 | Blohowiak | |
| 2017/0238056 A1 | 8/2017 | Greene et al. | |

FOREIGN PATENT DOCUMENTS

| | | |
|---|---|---|
| CN | 103034841 A | 4/2013 |
| CN | 103197931 | 7/2013 |
| JP | 2003179908 A | 6/2003 |
| JP | 2007174378 A | 7/2007 |
| JP | 2008015854 A | 1/2008 |
| JP | 2008165700 A | 7/2008 |
| JP | 2008271268 A | 11/2008 |
| JP | 2009089065 A | 4/2009 |
| JP | 2009296346 A | 12/2009 |
| JP | 2010103764 A | 5/2010 |
| JP | 2010154342 A | 7/2010 |
| JP | 2012003433 | 1/2012 |
| JP | 2012044358 A | 3/2012 |
| JP | 2013501975 A | 1/2013 |
| WO | 2014194020 A1 | 12/2014 |
| WO | WO2014194020 | 12/2014 |

OTHER PUBLICATIONS

YouTube video by: Karenzuelalulz; published on Jun. 21, 2009: https://www.youtube.com/watch?v=MhpTDarr6c8 (examiner printed (Jul. 11, 2017) NPL pdf pp. 1-4; file named YouTube_karenzuelalulz ).

Office Action for JP2016-576020 dated Aug. 27, 2020 (English translation).

* cited by examiner

700

702
Identify an Image Corresponding to a Media Asset, Wherein the Image Comprises a Plurality of Portions, and Wherein Each Portion of the Plurality of Portions Comprises a Respective Entity

704
Determine an Identity of Each Respective Entity in Each Respective Portion of the Plurality of Portions

706
Access a Database to Determine a Level of Prevalence of Each Identity in the Media Asset

708
Determine Which Respective Entity Corresponds to a Highest Level of Prevalence

710
Generate for Display a Respective Portion Comprising the Respective Entity that Corresponds to the Highest Level of Prevalence

802 — Identify a Plurality of Images Corresponding to a Media Asset, Wherein Each Image of the Plurality of Images Comprises At Least One Portion, and Wherein Each Portion Comprises a Respective Entity

804 — Determine an Identity of Each Respective Entity

806 — Access a User Profile from a Database

808 — Cross-reference Metadata of the User Profile with Each Identity of Each Respective Entity

810 — Identify a Preferred Entity Based on the Cross-referencing

812 — Determine an Image of the Plurality of Images Where the Preferred Entity is Most Prevalent

814 — Generate for Display the Image

FIG. 8

SYSTEMS AND METHODS FOR AUTOMATIC FORMATTING OF IMAGES FOR MEDIA ASSETS BASED ON USER PROFILE

CROSS-REFERENCE TO RELATED APPLICATIONS

This application is a continuation of U.S. patent application Ser. No. 14/752,031, filed Jun. 26, 2015 (allowed), which is hereby incorporated by reference herein in its entirety.

BACKGROUND

As media guidance applications proliferate and become more ubiquitous, images are used to illustrate media assets that may be of interest to a user. For example, box art or poster art corresponding to a particular movie may be displayed adjacent to text describing that particular movie. This box art or poster art is selected for display based solely on a corresponding media asset, and is not personalized.

SUMMARY

Systems and methods are provided herein for personalizing images that correspond to a media asset identifier by using user profile information. As an example, the television series "Community" has several actors, such as Joel McHale, Chevy Chase, and Ken Jeong. Poster art developed by an editor of "Community" may include an image that portrays each of Joel McHale, Chevy Chase, and Ken Jeong. In order to personalize the image, control circuitry may determine which actor(s) the user prefers, and crop out only those actors in the poster art to create a personalized image. As an example, if the user prefers Joel McHale, control circuitry may crop out the portrayal of Joel McHale and use only that portion of the image to display next to other text describing "Community."

To achieve these ends and others, systems and methods are provided herein for selectively generating for display portions of an image based on a user profile. In some aspects, these systems and methods comprise control circuitry identifying an image corresponding to a media asset, where the image comprises a plurality of portions, and where each portion of the plurality of portions comprises a respective entity. For example, control circuitry may identify a poster, picture, box art, and/or the like, that corresponds to a media asset, such as the hit series "Community" starring actors Joel McHale, Chevy Chase, and Ken Jeong. The image identified by control circuitry may include several portions, where each portion includes a respective entity. For example, control circuitry may determine that the image portrays each of Joel McHale, Chevy Chase, and Ken Jeong, and control circuitry may demark each portion that contains each separate actor as a separate portion of the image.

In some embodiments, control circuitry may determine an identity of each respective entity in each respective portion of the plurality of portions. Following the example from above, control circuitry may determine that one portion includes Joel McHale, another portion includes Chevy Chase, and another portion includes Ken Jeong. Control circuitry may make these determinations based on image recognition algorithms, by consulting metadata corresponding to the image, or by any other known mechanism.

In some embodiments, control circuitry may access a user profile from a database. For example, control circuitry may query a remote or local database to access a user profile that corresponds to a present user of a user equipment that control circuitry is implemented in or associated with. Control circuitry may, responsive to the query, receive information from the user profile.

In some embodiments, control circuitry may cross-reference metadata of the user profile with each identity of each respective entity from the image. For example, control circuitry may compare information of the user profile with information corresponding to each entity represented in the image. Following from the example above, control circuitry may cross-reference information indicating user preferences from the user profile against metadata corresponding to each of Joel McHale, Ken Jeong, and Chevy Chase, in an effort to determine which actor(s) the user may prefer. Control circuitry may then identify a preferred entity based on the cross-referencing.

In some embodiments, control circuitry may generate for display the respective portion comprising the preferred entity. For example, control circuitry may crop one or more entities that the user prefers from the original image and display the cropped image in place of the original image. Doing so may cause an image that a user is more likely to prefer to be displayed.

In some embodiments, when control circuitry generates for display the respective portion, control circuitry may crop the image to include less than the entire image and to include the preferred entity. Control circuitry may crop the image by removing portions of the image that do not include the preferred entity. Any known means of image cropping may be used to achieve the objects of these embodiments.

In some embodiments, when control circuitry identifies the preferred entity, control circuitry may identify an entity of the image that the user profile reflects a user associated with the user profile is likely to prefer. For example, control circuitry may determine that a particular user enjoys comedy. Control circuitry may determine that Ken Jeong is an outspoken comedian. Accordingly, control circuitry may identify Ken Jeong as the preferred entity, as Ken Jeong satisfies a characteristic that the user profile indicates the user would enjoy.

In some embodiments, when control circuitry is identifying the preferred entity based on the cross-referencing, control circuitry may identify an affinity of the user with respect to each entity in the image. For example, control circuitry may, based on the user's profile, determine a degree to which a user prefers each entity. The control circuitry may then rank each respective entity (e.g., based on the determined degree). Control circuitry may then identify a subset of adjacent portions of the plurality of portions that comprise respective entities associated with a highest combined rank as compared to each other subset of adjacent portions of the plurality of portions. For example, control circuitry may determine that two adjacent entities (e.g., Ken Jeong and Chevy Chase) have a higher combined degree of preference, as compared to two other adjacent entities in the image. Control circuitry may then generate for display the respective portion comprising the preferred entity, where doing so comprises generating for display the subset of the adjacent portions. As an example, control circuitry may crop both the portion containing Ken Jeong, as well as the portion containing Chevy Chase, to create a new image with that contains both entities.

In some embodiments, when control circuitry determines an identity of each respective entity in each respective portion of the plurality of portions, control circuitry may perform facial recognition on each respective entity of the image. For example, control circuitry may identify facial characteristics of each entity and cross-reference those facial characteristics against listings in a database of characteristics of individuals to identify a best guess of who each respective entity corresponds to. In some embodiments, the database that control circuitry compares the facial characteristics against may be a knowledge graph.

In some embodiments, control circuitry may identify a plurality of preferred entities based on the cross-referencing. For example, control circuitry may identify two or more entities in the image that a user may prefer. Following the example from above, if the image is poster art corresponding to the television show "Community," and each of Chevy Chase, Joel McHale, and Ken Jeong is depicted in the poster art, the control circuitry may determine that the user prefers all of Ken Jeong, Chevy Chase, and Joel McHale. Control circuitry may then generate for display a sufficient amount of the plurality of portions comprising entities of the plurality of preferred entities to satisfy a specified aspect ratio requirement. For example, if a specified aspect ratio requirement can accommodate only two portions, and an amalgamation of portions including representations of Ken Jeong and Joel McHale most closely satisfies the specified aspect ratio requirement, control circuitry may crop the portions including Ken Jeong and Joel McHale and generate for display the cropped image.

In some embodiments, control circuitry may receive a selection by a user of the respective portion, and generate for display the image in response to receiving the selection. For example, if control circuitry receives a selection by the user of a displayed portion of the image, control circuitry may responsively display the full, original image (e.g., along with a page providing additional information about a media asset corresponding to the image).

In some embodiments, control circuitry may recognize textual content in the image, and generate for simultaneous display the textual content with the respective portion comprising the preferred entity. For example, if the original image includes textual content (e.g., the title "Community"), control circuitry may cause that textual content to be superimposed on the respective portion (e.g., a cropped portion including a preferred actor).

In some embodiments, control circuitry may determine characteristics of the preferred entity, and may then determine optimal characteristics for features surrounding the entity in the respective portion corresponding to the preferred entity. Based on the determined optimal characteristics, control circuitry may alter characteristics of the features surrounding the entity to reflect the optimal characteristics. For example, control circuitry may consider the skin tone of the preferred entity, and may then lighten or darken surrounding features of the image, such as the color of the sky or background surrounding the depiction of the preferred entity.

In some aspects, control circuitry may identify an image corresponding to a media asset, where the image comprises a plurality of portions, and where each portion of the plurality of portions comprises a respective entity. For example, control circuitry may identify a poster, picture, box art, and/or the like, that corresponds to a media asset, such as the hit series "Community" starring actors Joel McHale, Chevy Chase, and Ken Jeong. The image identified by control circuitry may include several portions, where each portion includes a respective entity. For example, control circuitry may determine that the image portrays each of Joel McHale, Chevy Chase, and Ken Jeong, and control circuitry may demark each portion that contains each separate actor as a separate portion of the image.

In some embodiments, control circuitry may determine an identity of each respective entity in each respective portion of the plurality of portions. Following the example from above, control circuitry may determine that one portion includes Joel McHale, another portion includes Chevy Chase, and another portion includes Ken Jeong. Control circuitry may make these determinations based on image recognition algorithms, by consulting metadata corresponding to the image, or by any other known mechanism.

In some embodiments, control circuitry may access a database to determine a level of prevalence of each identity in the media asset. For example, control circuitry may, when accessing the database, identify relative amounts of screen time of particular actors, or relative amounts of frames where an actor is the sole character in a frame. Based on these identifications, control circuitry may determine which respective entity corresponds to a highest level of prevalence (e.g., with respect to the other entities).

In some embodiments, control circuitry may generate for display a respective portion comprising the respective entity that corresponds to the highest level of prevalence. For example, following from the example above, if Joel McHale has more screen time than Chevy Chase and Ken Jeong in the show community, control circuitry may generate for display an image of Joel McHale.

In some embodiments, control circuitry may access a user profile from a database. For example, control circuitry may query a remote or local database to access a user profile that corresponds to a present user of a user equipment that control circuitry is implemented in or associated with. Control circuitry may, responsive to the query, receive information from the user profile.

In some embodiments, control circuitry may cross-reference metadata of the user profile with each identity of each respective entity. For example, control circuitry may compare information of the user profile with information corresponding to each entity represented in the image. Following from the example above, control circuitry may cross-reference information indicating user preferences from the user profile against metadata corresponding to each of Joel McHale, Ken Jeong, and Chevy Chase, in an effort to determine which actor(s) the user may prefer. Control circuitry may then identify a preferred entity based on the cross-referencing.

In some embodiments, control circuitry may rank each respective entity based on the cross-referencing. For example, as discussed above, control circuitry may rank each respective entity based on how likely a user is to prefer that particular entity. Additionally, control circuitry may weight each respective entity based on a respective level of prevalence corresponding to the respective entity. For example, following from the example above, if Joel McHale is more prevalent than Chevy Chase and Ken Jeong because Joel McHale has relatively more screen time in the media asset "Community," then Joel McHale will have a high weight.

In some embodiments, control circuitry may heuristically combine the rank and weight of each respective entity to determine a combined rank of each respective entity. For example, if control circuitry determines that a user has a strong preference for Ken Jeong, and Ken Jeong has a low weight because he is not so prevalent in the media asset "Community," and control circuitry determines that a user strongly dislikes Joel McHale, but that Joel McHale has a high prevalence, control circuitry may consider all these factors heuristically to determine a combined rank. Because, in this case, Joel McHale is so strongly disliked, control circuitry may attribute a higher combined weight to Ken Jeong. Control circuitry may then generate for display a respective portion comprising the respective entity that corresponds to the highest combined rank (in this case, an image including Ken Jeong).

In some embodiments, control circuitry may identify a plurality of prevalent entities by determining two or more entities with the highest prevalence levels, relative to each other entity, and generate for display a sufficient amount of the plurality of portions comprising entities of the plurality of preferred entities to satisfy a specified aspect ratio requirement. For example, control circuitry may identify Ken Jeong and Joel McHale as having the two highest prevalence levels (in accordance with any manner described above and below). Control circuitry may identify two identities if a specified aspect ratio requirement can accommodate only two portions. Control circuitry may crop the portions including Ken Jeong and Joel McHale and generate for display the cropped image.

In some embodiments, control circuitry may determine characteristics of the entity that corresponds to the highest level of prevalence, and may then determine optimal characteristics for features surrounding the entity in the respective portion corresponding to the entity that corresponds to the highest level of prevalence. Based on the determined optimal characteristics, control circuitry may alter characteristics of the features surrounding the entity to reflect the optimal characteristics. For example, control circuitry may consider the skin tone of the entity that corresponds to the highest level of prevalence, and may then lighten or darken surrounding features of the image, such as the color of the sky or background surrounding the depiction of the entity corresponding to the highest level of prevalence.

In some embodiments, control circuitry may determine the level of prevalence based on at least one of screen time, amount of time in close-up footage, amount of time in wide shot footage, and amount of time of being the sole character in a frame in the media asset.

In some aspects, control circuitry may identify a plurality of images corresponding to a media asset, where each image of the plurality of images comprises at least one portion, and where each portion comprises a respective entity. For example, control circuitry may identify a poster, picture, box art, and/or the like, that corresponds to a media asset, such as the hit series "Community" starring actors Joel McHale, Chevy Chase, and Ken Jeong. The images identified by control circuitry may include several portions, where each portion includes a respective entity. For example, control circuitry may determine that the image portrays each of Joel McHale, Chevy Chase, and Ken Jeong, and control circuitry may demark each portion that contains each separate actor as a separate portion of the image.

In some embodiments, control circuitry may determine an identity of each respective entity. Following the example from above, control circuitry may determine that one entity represents Joel McHale, another entity represents Chevy Chase, and another entity represents Ken Jeong. Control circuitry may make these determinations based on image recognition algorithms, by consulting metadata corresponding to the image, or by any other known mechanism.

In some embodiments, control circuitry may access a user profile from a database. For example, control circuitry may query a remote or local database to access a user profile that corresponds to a present user of a user equipment that control circuitry is implemented in or associated with. Control circuitry may, responsive to the query, receive information from the user profile.

In some embodiments, control circuitry may cross-reference metadata of the user profile with each identity of each respective entity. For example, control circuitry may compare information of the user profile with information corresponding to each entity. Following from the example above, control circuitry may cross-reference information indicating user preferences from the user profile against metadata corresponding to each of Joel McHale, Ken Jeong, and Chevy Chase, in an effort to determine which actor(s) the user may prefer. Control circuitry may then identify a preferred entity based on the cross-referencing.

In some embodiments, control circuitry may determine an image of the plurality of images where the preferred entity is more prevalent, and may generate for display that image. For example, control circuitry may determine that Ken Jeong is the preferred entity. Control circuitry may determine that there are three candidates images in the plurality of images, where one includes all of Joel McHale, Ken Jeong, and Chevy Chase, one includes only Ken Jeong, and one includes the entire cast of the media asset "Community." Control circuitry may determine that the image including only Ken Jeong is the image in which Ken Jeong is most prevalent. Control circuitry may then generate for display the image including Ken Jeong. The display of the image may be generated using any manner discussed above and below with respect to other embodiments.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is a flowchart of illustrative steps involved in determining which portion of an image to generate for display based on a level of prevalence of an identity of an entity in a media asset, in accordance with some embodiments of the disclosure; and FIG. 8 is a flowchart of illustrative steps involved in selectively generating for display an image of a plurality of

DETAILED DESCRIPTION

Figure 1:
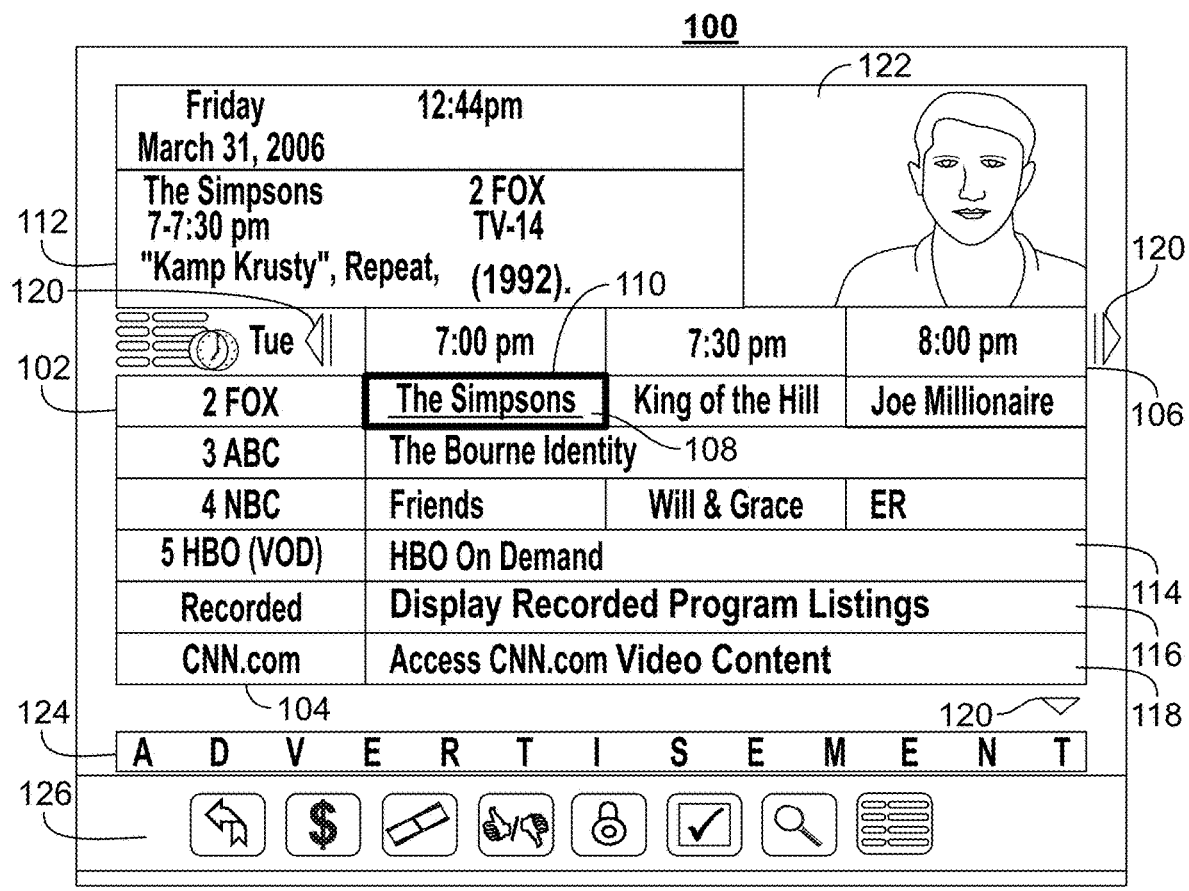
FIG. 1 shows an illustrative embodiment of a display screen that may be used to provide media guidance application listings and other media guidance information, in accordance with some embodiments of the disclosure.

To achieve these ends and others, systems and methods are provided herein for selectively generating for display portions of an image based on a user profile. In some aspects, these systems and methods comprise control circuitry identifying an image corresponding to a media asset, where the image comprises a plurality of portions, and where each portion of the plurality of portions comprises a respective entity. For example, control circuitry may identify a poster, picture, box art, and/or the like, that corresponds to a media asset, such as the hit series "Community" starring actors Joel McHale, Chevy Chase, and Ken Jeong. The image identified by control circuitry may include several portions, where each portion includes a respective entity. For example, control circuitry may determine that the image portrays each of Joel McHale, Chevy Chase, and Ken Jeong, and control circuitry may demark each portion that contains each separate actor as a separate portion of the image.

In some embodiments, control circuitry may determine an identity of each respective entity in each respective portion of the plurality of portions. Following the example from above, control circuitry may determine that one portion includes Joel McHale, another portion includes Chevy Chase, and another portion includes Ken Jeong. Control circuitry may make these determinations based on image recognition algorithms, by consulting metadata corresponding to the image, or by any other known mechanism.

In some embodiments, control circuitry may access a user profile from a database. For example, control circuitry may query a remote or local database to access a user profile that corresponds to a present user of a user equipment that control circuitry is implemented in or associated with. Control circuitry may, responsive to the query, receive information of the user profile.

In some embodiments, control circuitry may cross-reference metadata from the user profile with each identity of each respective entity of the image. For example, control circuitry may compare information from the user profile with information corresponding to each entity represented in the image. Following from the example above, control circuitry may cross-reference information indicating user preferences from the user profile against metadata corresponding to each of Joel McHale, Ken Jeong, and Chevy Chase, in an effort to determine which actor(s) the user may prefer. Control circuitry may then identify a preferred entity based on the cross-referencing.

In some embodiments, control circuitry may generate for display the respective portion comprising the preferred entity. For example, control circuitry may crop one or more entities that the user prefers from the original image and display the cropped image in place of the original image. Doing so may cause an image that a user is more likely to prefer to be displayed.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
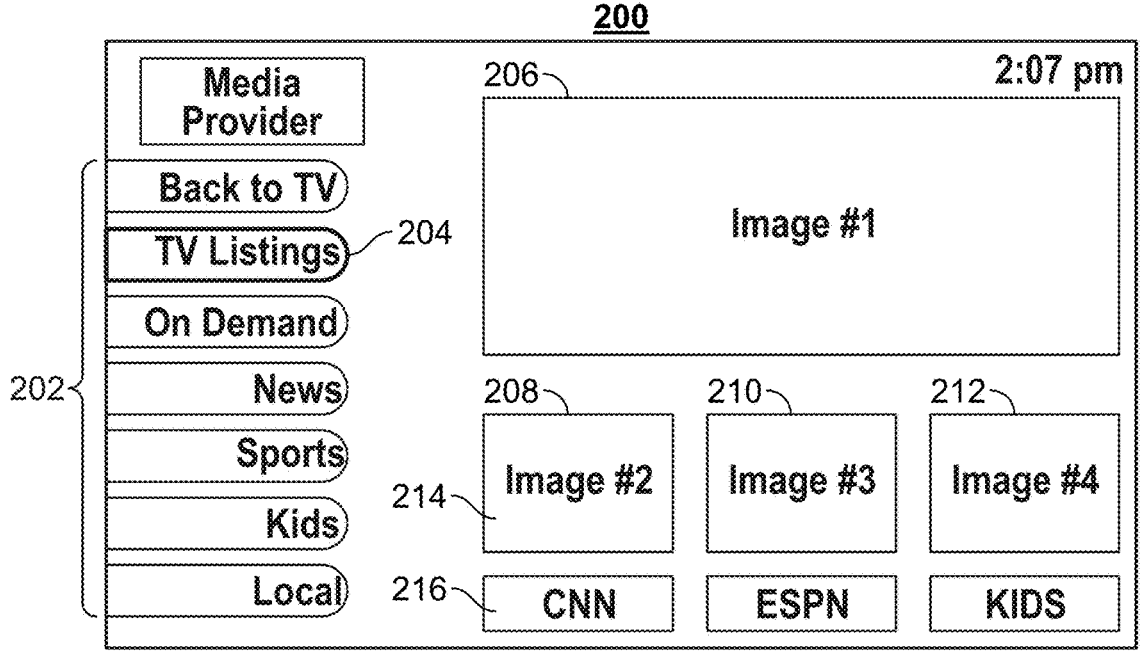
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 3:
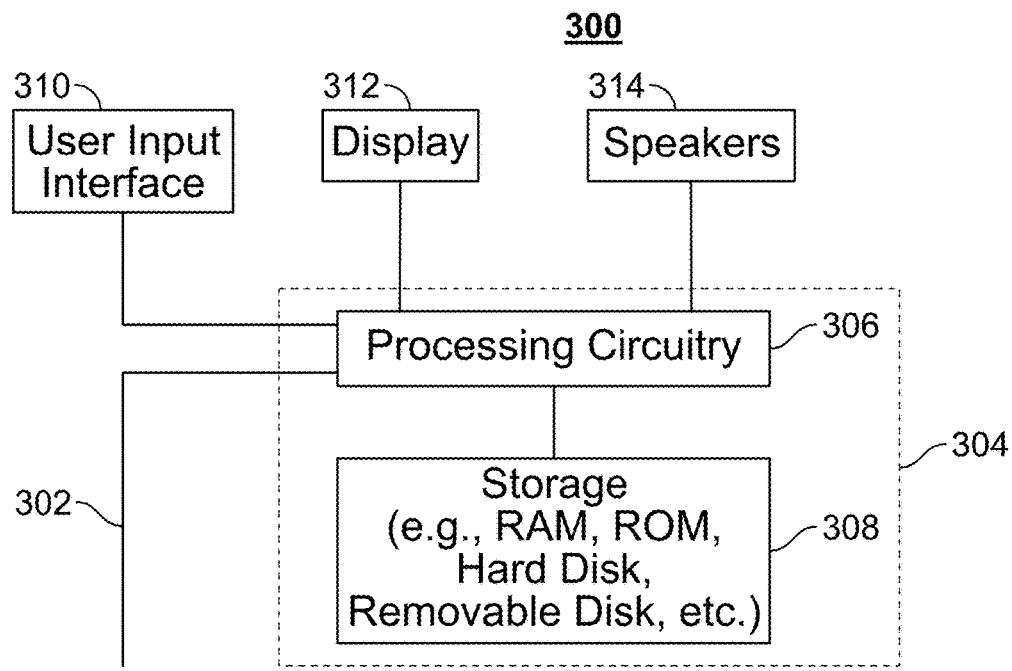
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
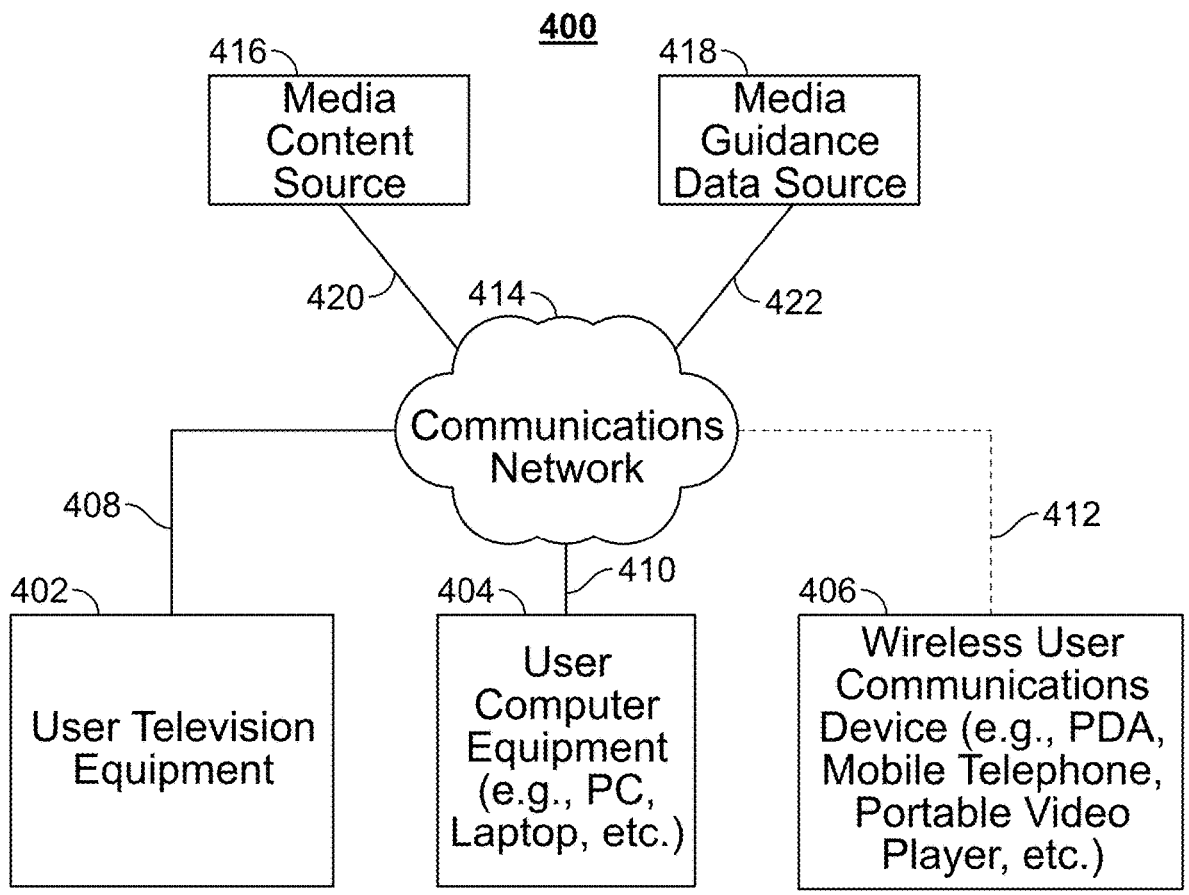
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
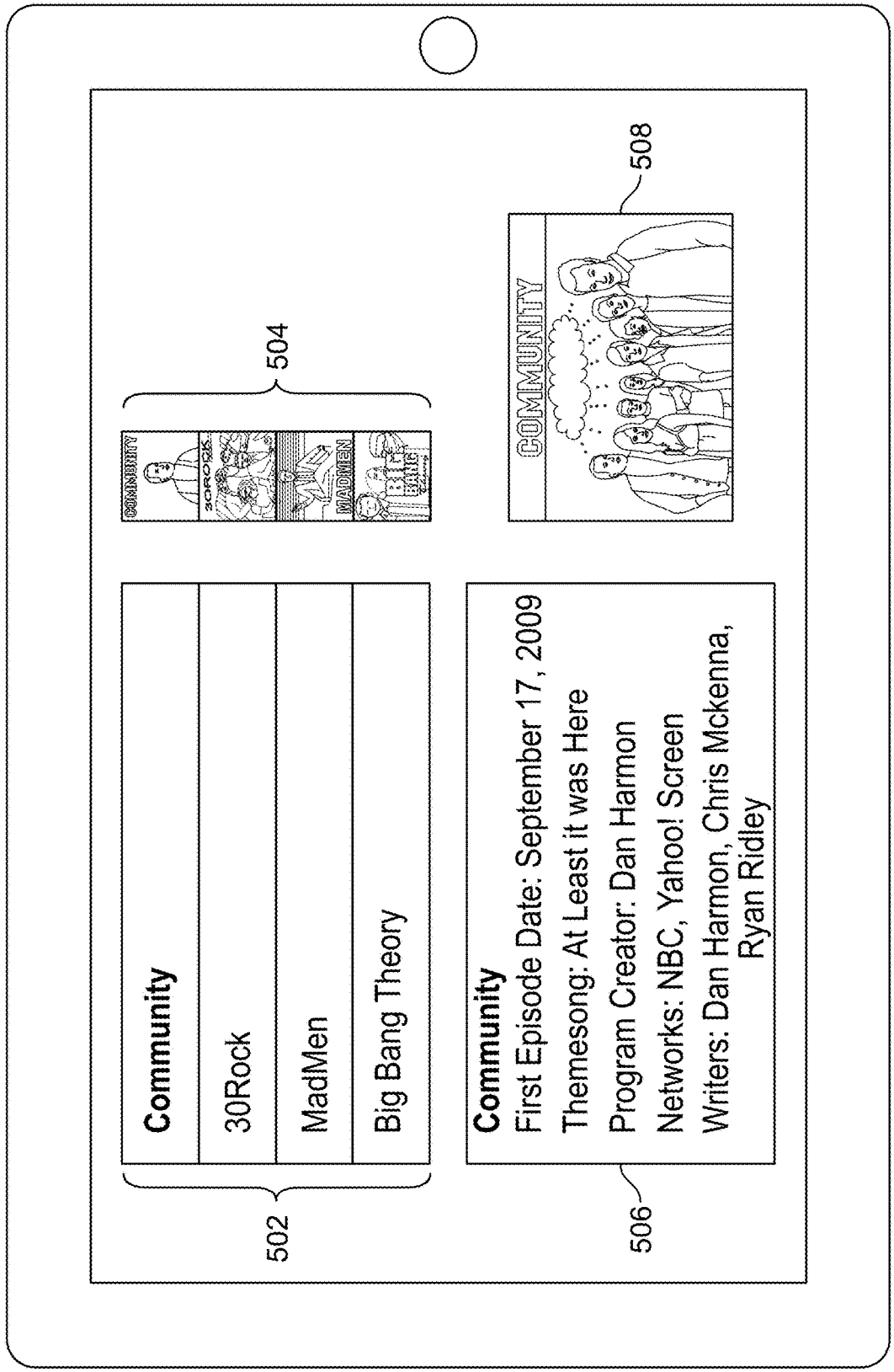
FIG. 5 shows an illustrative embodiment of a user equipment device on which an image, portions of images, media asset identifiers, and other information are displayed, in accordance with some embodiments of the disclosure.

FIG. 5 shows an illustrative embodiment of a user equipment device on which an image, portions of images, media asset identifiers, and other information are displayed, in accordance with some embodiments of the disclosure. FIG. 5 depicts user equipment 500 (which may include the functionality of user equipment 402, 404, and/or 406). Control circuitry 304 may cause user equipment 500 to display media asset identifiers 502, and image portions 504. Control circuitry 304 may generate for display a given image portion 504 in a manner such that the given image portion 504 corresponds to an adjacent media asset identifier 502. When control circuitry 304 detects a user selection of a given media asset identifier 502, control circuitry 304 may cause a display of descriptive information 506 corresponding to the selected given media asset identifier 502. Additionally, when control circuitry 304 detects a user selection of the given media asset identifier 502, control circuitry 304 may generate for display image 508 that corresponds to the selected media asset identifier 502. In some embodiments, image 508 may be a larger image from which image portion 504 was cropped. Any of elements 502, 504, 506, and 508 may be optionally displayed or omitted from the display illustrated in FIG. 5. Furthermore, the manner in which elements 502, 504, 506, and 508 is illustrated are merely illustrative, and these illustrations may be rearranged in any manner.

In some embodiments, control circuitry 304 may identify an image corresponding to a media asset. For example, control circuitry 304 may determine that media asset identifier 502 corresponds to the media asset "Community," which is a comedy series starring actors Joel McHale, Ken Jeong, and Chevy Chase. Control circuitry 304 may identify an image (e.g., image 508) that corresponds to the media asset "Community." Image 508 may be any image associated with "Community," such as poster art, box art, fan art, a photograph, a frame of a video, or any other image including any actor or identifying information corresponding to the media asset identified by media asset identifier 502. Control circuitry 304 may identify image 508 by cross-referencing a database (e.g., media guidance data source 418, accessed by way of communications network 414) that includes entries corresponding to media asset metadata. Image 508 may include a plurality of portions, where each portion includes a respective entity. For example, image 508 may correspond to the media asset "Community," and may include depictions of Joel McHale, Chevy Chase, and Ken Jeong. Control circuitry 304 may partition image 508 into portions, where each portion includes an identified entity.

In some embodiments, control circuitry 304 may determine an identity of each respective entity in each respective portion of the plurality of portions. Control circuitry 304 may determine the entity by using any known mechanism. As an example, control circuitry 304 may determine the identity of Chevy Chase in image 508 by accessing metadata corresponding to image 508 and determining therefrom that Chevy Chase is depicted in a certain part of image 508. As another example, control circuitry 304 may utilize image recognition technology (e.g., facial recognition technology), where control circuitry 304 recognizes unique characteristics of each entity, and then cross-references those unique characteristics against a database (e.g., storage 306) to find an entity that matches the characteristics. In some embodiments, when determining the identity of an entity of image 508, control circuitry 304 may consult a knowledge graph and may provide the knowledge graph any metadata associated with a given entity, and/or may provide the knowledge graph with any other data associated with a given entity (such as data gleaned from image recognition processes, and/or data gleaned from user interaction with images of entities similar to the given entity). Knowledge graphs and their features are described in greater detail in U.S. patent application Ser. No. 14/501,504, filed Sep. 30, 2014, U.S. patent application Ser. No. 14/500,309, filed Sep. 29, 2014, and U.S. patent application Ser. No. 14/448,308, filed Jul. 31, 2014, which are hereby incorporated by reference herein in their entireties.

In some embodiments, control circuitry 304 may access a user profile from a database. For example, control circuitry may access a user profile of a current user of user equipment 500 by retrieving the user profile from a database. The database may be local (e.g., storage 306) or remote (e.g., media guidance data source 418 or media content source 416, accessible by way of communications network 414). The user profile may indicate preferences of the user of user equipment 500.

In some embodiments, control circuitry 304 may cross-reference metadata of the user profile with each identity of each respective entity depicted in image 508. In some embodiments, the metadata may comprise preference information corresponding to the user. For example, control circuitry 304 may cross-reference information corresponding to the user's preference for the actor Chevy Chase against the identity of Chevy Chase, as identified by control circuitry 304 above as an entity of image 508. Control circuitry 304 may responsively identify a preferred entity based on the cross-referencing. For example, control circuitry 304 may determine that of Joel McHale, Chevy Chase, and Ken Jeong depicted in image 508, where image 508 represents the media asset "Community," the user of user equipment 500 prefers Chevy Chase.

In some embodiments, control circuitry 304 may generate for display the respective portion comprising the preferred entity. For example, the media guidance application illustrated in FIG. 5 may cause image portion 504 that is depicted next to media asset identifier 502 to be a cropped portion of image 508 that includes an entity that the user of user equipment 500 prefers. Following the "Community" example above, control circuitry 304 may crop a portion of image 508 that includes Chevy Chase, but does not include Joel McHale or Ken Jeong, and generate for display that cropped portion as image portion 504. In this manner, control circuitry 304 may cause the media guidance application running on user equipment 500 to be personalized to a user such that portions of art corresponding to a given media asset identifier 502 are displayed in image 504, instead of full image 508 which includes entities that the user is not interested in.

In some embodiments, when control circuitry 304 is identifying the preferred entity based on the cross-referencing, control circuitry 304 may identify an affinity of the user with respect to each entity in the image. For example, control circuitry 304 may determine that a user profile reflects that a user really likes Chevy Chase, and may therefore identify a high affinity of the user with respect to Chevy Chase. Control circuitry 304 may identify that a user is indifferent with respect to Joel McHale, and may therefore identify a neutral affinity of the user with respect to Joel McHale. Control circuitry 304 may identify that a user dislikes Ken Jeong, and may therefore identify a negative affinity of the user with respect to Ken Jeong.

In some embodiments, control circuitry 304 may rank each respective affinity. Following from the example above, control circuitry would rank the affinity from "high," to "neutral," to "negative." Accordingly, Chevy Chase would be ranked first, Joel McHale would be ranked second, and Ken Jeong would be ranked third.

Control circuitry 304 may then identify a subset of adjacent portions of the plurality of portions that comprise respective entities associated with the highest combined rank as compared to each other subset of adjacent portions of the plurality of portions of image 508. For example, image 508 may depict Joel McHale in a left portion of image 508, Chevy Chase in a middle portion of image 508, and Ken Jeong in a right portion of image 508. Control circuitry 304 may determine adjacent entities. For example, Joel McHale and Chevy Chase are entities depicted in adjacent portions, as the left and middle portions of image 508 are adjacent to one another. Similarly, Chevy Chase and Ken Jeong are entities depicted in adjacent portions, as the middle and right portions of image 508 are adjacent to one another. Control circuitry may combine the rank of each adjacent entity in any known manner, such as averaging the rank of the adjacent entities. For example, the average rank of Joel McHale and Chevy Chase would be 1.5, and the average rank of Chevy Chase and Ken Jeong would be 2.5.

In some embodiments, control circuitry 304 may then generate for display image portion 504 as including the subset of image portions (e.g., the two or more adjacent image portions with the highest combined rank). In some embodiments, control circuitry 304 may perform similar processes using non-adjacent portions of image 508, where the non-adjacent portions of image 508 that are to be depicted in image portion 504 are stitched together using any known image stitching mechanism.

In some embodiments, control circuitry 304 may identify a plurality of preferred entities based on the cross-referencing. For example, control circuitry may, as discussed above, determine an affinity of the user for each entity of image 508. Control circuitry 304 may determine a threshold entity, or retrieve a threshold affinity from a database (e.g., storage 308 or media guidance data source 418). Control circuitry 304 may identify a plurality of preferred entities depicted in image 508 by determining which entities of image 508 correspond to an affinity that equals or exceeds the threshold affinity.

In some embodiments, control circuitry 304 may generate for display a sufficient amount of the plurality of portions comprising entities of the plurality of preferred entities to satisfy a specified aspect ratio requirement. As an example, control circuitry 304 may determine a specified aspect ratio requirement by determining dimensions of image portion 504 that the media guidance application used by user equipment 500 is programmed to display. Control circuitry 304 may determine, that exactly two portions of image 508 are required to satisfy the determined dimensions. Control circuitry 304 may then select two portions for display as image portion 504 to satisfy the specified aspect ratio requirement (e.g., using any manner to select multiple portions described above and below).

In some embodiments, control circuitry 304 may receive a selection by a user of the respective portion of image 508, and may generate for display image portion 504 in response to receiving the selection. For example, control circuitry 304 may receive a selection or indication from the user that the user prefers Chevy Chase by the user selecting the depiction of Chevy Chase in image 508. Alternatively, control circuitry 304 may receive this selection by the user describing Chevy Chase as a preferred actor in any known manner without specifically selecting Chevy Chase in image 508 itself. Control circuitry 304 may responsively generate for display image portion 504 including a portion of image 508 including Chevy Chase in response to receiving the selection.

In some embodiments, control circuitry 304 may recognize textual content in image 508. As an example, image 508 includes the textual content of the title of the media asset "Community." Control circuitry 304 may recognize that the text "Community" exists in image 508. Control circuitry 304 may generate for simultaneous display the textual content with the respective portion comprising the preferred entity. For example, control circuitry 304 may, when generating for display image portion 504, include the textual content "Community" in the generated display of image portion 504. Control circuitry 304 may maintain the composition of the textual content, or may alter it (e.g., in terms of style, content, size, or any other manner).

In some embodiments, control circuitry 304 may determine that a plurality of images corresponding to a given media asset identifier 502 exist. Control circuitry may determine which image(s) 508 to generate for display by determining an image the user prefers in any manner described above or below with respect to determining which image portion 504 to generate for display. In some embodiments, a preferable image or a stitched set of preferable images may be generated for display where image portion 504 is generated for display, where preferable images or stitched sets of images are determined in any manner described above and below.

In another aspect, control circuitry 304 may selectively generate for display portions of an image (e.g., image portion 504). Control circuitry 304 may achieve this end by first identifying an image corresponding to a media asset (e.g., image 508), where the image comprises a plurality of portions, and wherein each portion of the plurality of portions comprises a respective entity. Control circuitry 304 may perform the identifying in any manner discussed above and below.

In some embodiments, control circuitry 304 may determine an identity of each respective entity in each respective portion of the plurality of portions. Control circuitry 304 may determine the identity in any manner described above and below.

In some embodiments, control circuitry 304 may access a database to determine a level of prevalence of each identity in the media asset. The database may be local to control circuitry 304 (e.g., at storage 308), or remote to control circuitry 304 (e.g., at media guidance data source 418, accessed by way of communications network 414). Control circuitry 304 may, when accessing the database, retrieve information that may be used to determine a level of prevalence of each identity in the media asset. For example, control circuitry 304 may retrieve information relating to screen time, amount of time in close-up footage, amount of time in wide shot footage, an amount of time of being the sole character in a frame for each identity with respect to the media asset. Control circuitry 304 may determine the level of prevalence by comparing any of, or a combination of, these factors, with respect to any given identity. In some embodiments, control circuitry 304 may determine which respective entity corresponds to a highest level of prevalence. For example, after control circuitry 304 has determined a level of prevalence for each identity, control circuitry 304 may determine which respective entity has the highest level of prevalence. For example, following from the "Community" example, Joel McHale has more screen time in "Community" than Chevy Chase, and thus Joel McHale may be assigned a higher level of prevalence than Chevy Chase.

In some embodiments, control circuitry 304 may generate for display a respective portion comprising the respective entity that corresponds to the highest level of prevalence (e.g., at image portion 504 or image 508). Control circuitry 304 may generate for display the respective portion in any manner described above and below.

In some embodiments, control circuitry 304 may access a user profile from a database, cross-reference metadata of the user profile with each identity of each respective entity, and rank each respective entity based on the cross-referencing. Control circuitry 304 may perform these functions in any manner described above and below.

In some embodiments, control circuitry 304 may weight each respective entity based on a respective level of prevalence corresponding to the respective entity. For example, following from the example above, if Joel McHale is more prevalent than Chevy Chase and Ken Jeong because Joel McHale has relatively more screen time in the media asset "Community," then control circuitry 304 may assign Joel McHale a high weight.

In some embodiments, control circuitry 304 may heuristically combine the rank and weight of each respective entity to determine a combined rank of each respective entity. For example, if control circuitry 304 determines that a user has a strong preference for Ken Jeong, and Ken Jeong has a low weight because he is not so prevalent in the media asset "Community," and control circuitry 304 determines that a user strongly dislikes Joel McHale, but that Joel McHale has a high prevalence, control circuitry 304 may consider all these factors heuristically to determine a combined rank. Because, in this case, Joel McHale is so strongly disliked, control circuitry 304 may attribute a higher combined weight to Ken Jeong. Control circuitry 304 may then generate for display (e.g., on display 312 of user equipment 500 at image portion 504) a respective portion comprising the respective entity that corresponds to the highest combined rank (in this case, an image including Ken Jeong).

In some embodiments, control circuitry 304 may identify a plurality of prevalent entities by determining two or more entities with the highest prevalence levels, relative to each other entity, and generate for display (e.g., on display 312) a sufficient amount of the plurality of portions comprising entities of the plurality of preferred entities to satisfy a specified aspect ratio requirement. For example, control circuitry 304 may identify Ken Jeong and Joel McHale as having the two highest prevalence levels (in accordance with any manner described above and below). Control circuitry 304 may identify two identities if a specified aspect ratio requirement can accommodate only two portions. Control circuitry 304 may crop the portions including Ken Jeong and Joel McHale and generate for display the cropped image. The specified aspect ratio may be a height to width ratio or a specified dimension of image portion 504 that control circuitry 304 is required to meet when generating for display an image or image portion.

In some embodiments, control circuitry 304 may determine characteristics of the entity that correspond to the highest level of prevalence, and may then determine optimal characteristics for features surrounding the entity in the respective portion corresponding to the entity that corresponds to the highest level of prevalence. Based on the determined optimal characteristics, control circuitry 304 may alter characteristics of the features surrounding the entity to reflect the optimal characteristics. For example, control circuitry 304 may consider the skin tone of the entity that corresponds to the highest level of prevalence, and may then lighten or darken surrounding features of the image (e.g., image portion 504 or image 508), such as the color of the sky or background surrounding the depiction of the entity corresponding to the highest level of prevalence.

Any feature described above with respect to any other aspect or embodiment of this disclosure may be implemented when selectively generating for display portion of an image based on level of prevalence.

In some aspects, control circuitry 304 may identify a plurality of images corresponding to a media asset, where each image of the plurality of images comprises at least one portion, and where each portion comprises a respective entity. For example, control circuitry 304 may identify a poster, picture, box art, and/or the like, that corresponds to a media asset, such as the hit series "Community" starring actors Joel McHale, Chevy Chase, and Ken Jeong. The images identified by control circuitry 304 may include several portions, where each portion includes a respective entity. For example, control circuitry 304 may determine that the image (e.g., image 508) portrays each of Joel McHale, Chevy Chase, and Ken Jeong, and control circuitry 304 may demark each portion that contains each separate actor as a separate portion of the image.

In some embodiments, control circuitry 304 may determine an identity of each respective entity. Following the example from above, control circuitry 304 may determine that one entity represents Joel McHale, another entity represents Chevy Chase, and another entity represents Ken Jeong. Control circuitry 304 may make these determinations based on image recognition algorithms, by consulting metadata corresponding to the image, or by any other known mechanism. Any manner of identifying images and determining an identity of a respective entity described above and is contemplated for use in this aspect.

In some embodiments, control circuitry 304 may access a user profile from a database. For example, control circuitry 304 may query a remote or local database to access a user profile that corresponds to a present user of a user equipment that control circuitry 304 is implemented in or associated with. Control circuitry 304 may, responsive to the query, receive information from the user profile. Any manner of accessing a user profile discussed above and below is contemplated for use in this aspect.

In some embodiments, control circuitry 304 may cross-reference metadata of the user profile with each identity of each respective entity. For example, control circuitry 304 may compare information of the user profile with information corresponding to each entity. Following from the example above, control circuitry 304 may cross-reference information indicating user preferences from the user profile against metadata corresponding to each of Joel McHale, Ken Jeong, and Chevy Chase, in an effort to determine which actor(s) the user may prefer. Control circuitry 304 may then identify a preferred entity based on the cross-referencing. Any manner of cross-referencing metadata of a user profile with an identity of a respective identity, described above and below, is contemplated for use in this aspect.

In some embodiments, control circuitry 304 may determine an image of the plurality of images where the preferred entity is more prevalent, and may generate for display that image (e.g., at image portion 504 or image 508). For example, control circuitry 304 may determine that Ken Jeong is the preferred entity. Control circuitry 304 may determine that there are three candidates images in the plurality of images, where one includes all of Joel McHale, Ken Jeong, and Chevy Chase, one includes only Ken Jeong, and one includes the entire cast of the media asset "Community." Control circuitry 304 may determine that the image including only Ken Jeong is the image in which Ken Jeong is most prevalent. Control circuitry 304 may then generate for display the image including Ken Jeong. The display of the image may be generated using any manner discussed above and below with respect to other embodiments. A determination of prevalence may be made consistent with any discussion of determining a level of prevalence, as discussed above and below. All other embodiments of any aspect described above and below are contemplated as applicable embodiments for this aspect involving selectively generating for display an image of a plurality of images.

Figure 6:
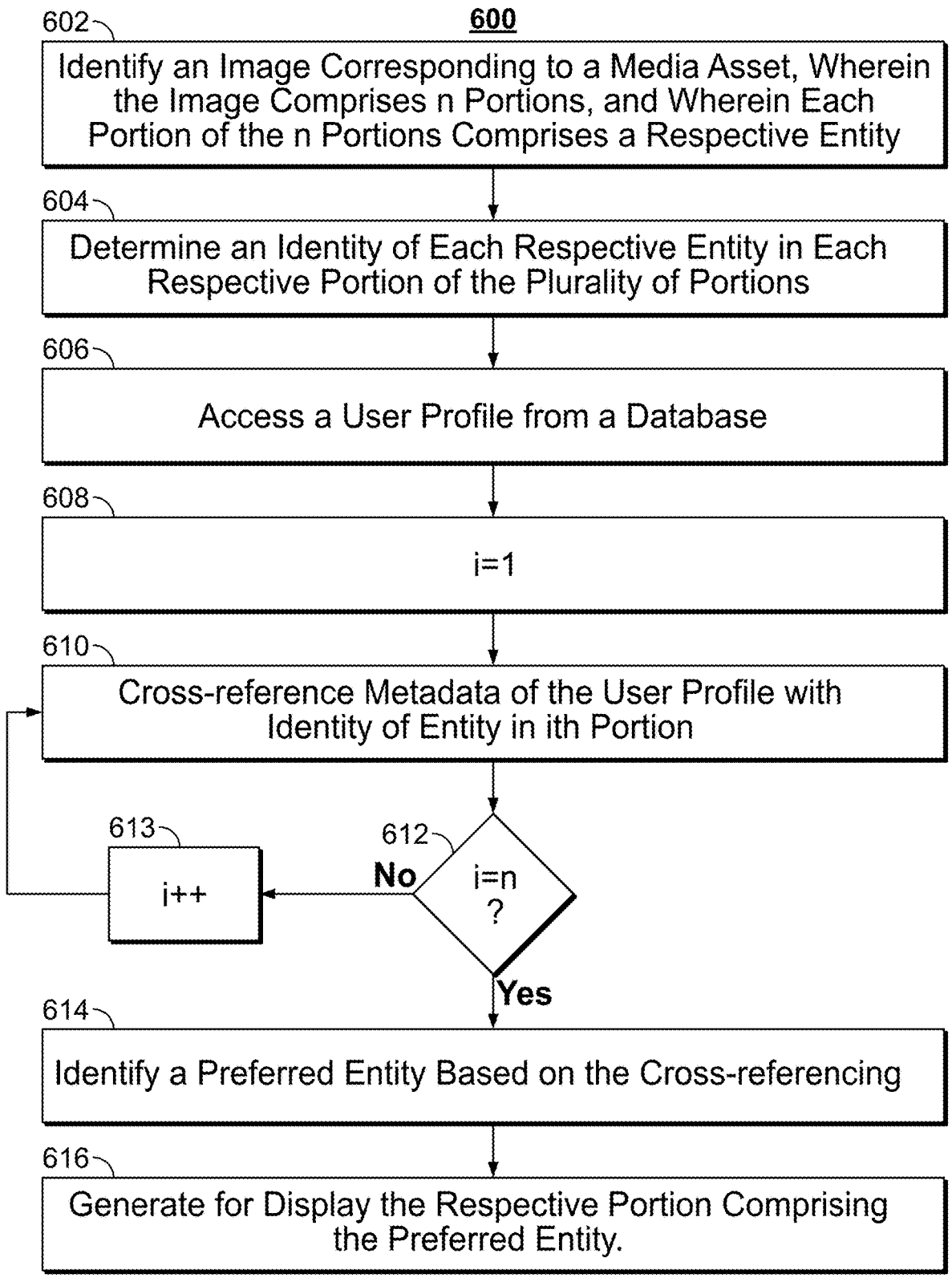
FIG. 6 is a flowchart of illustrative steps involved in determining which portion of an image to generate for display, in accordance with some embodiments of the disclosure.

FIG. 6 is a flowchart of illustrative steps involved in determining which portion of an image to generate for display. It should be noted that process 600 or any step thereof could be performed on, or provided by, any of the devices shown in FIGS. 3-5. For example, process 600 may be executed by control circuitry 304 (FIG. 3) as instructed by control circuitry implemented on user equipment 402, 404, and/or 406 (FIG. 4) in order to determine which portion of an image to generate for display. In addition, one or more steps of process 600 may be incorporated into or combined with one or more steps of any other process or embodiment, such as those described in FIG. 7 and FIG. 8.

Process 600 begins at 602, where control circuitry 304 may identify an image corresponding to a media asset, where the image includes n portions, and where each portion of the n portions comprises a respective entity. For example, control circuitry 304 may determine that media asset identifier 502 corresponds to the media asset "Community," which is a comedy series starring actors Joel McHale, Ken Jeong, and Chevy Chase. Control circuitry 304 may identify an image (e.g., image 508) that corresponds to the media asset "Community." Control circuitry 304 may identify image 508 by cross-referencing a database (e.g., media guidance data source 418, accessed by way of communications network 414)) that includes entries corresponding to media asset metadata. Image 508 may include a plurality of portions, where each portion includes a respective entity. For example, image 508 may correspond to the media asset "Community," and may include depictions of Joel McHale, Chevy Chase, and Ken Jeong. Control circuitry 304 may partition image 508 into portions, where each portion includes an identified entity (in this case, n=3).

Process 600 may then continue to 604, where control circuitry 304 may determine an identity of each respective entity in each respective portion of the plurality of portions. Control circuitry 304 may determine the entity by using any known mechanism. As an example, control circuitry 304 may determine the identity of Chevy Chase in image 508 by accessing metadata corresponding to image 508 and determining therefrom that Chevy Chase is depicted in a certain part of image 508. As another example, control circuitry 304 may utilize image recognition technology (e.g., facial recognition technology), where control circuitry 304 recognizes unique characteristics of each entity, and then cross-references those unique characteristics against a database (e.g., storage 306) to find an entity that matches the characteristics.

Process 600 may then continue to 606, where control circuitry 304 may access a user profile from a database. For example, control circuitry may access a user profile of a current user of user equipment 500 by retrieving the user profile from a database. The database may be local (e.g., storage 306) or remote (e.g., media guidance data source 418 or media content source 416, accessible by way of communications network 414). The user profile may indicate preferences of the user of user equipment 500.

Process 600 may then continue to 608, where a counter i is initialized to 1. Process 600 may then continue to 610, where control circuitry 304 may cross-reference metadata of the user profile with the identity of the entity in the ith portion of image 508. In some embodiments, the metadata may comprise preference information corresponding to the user. For example, control circuitry 304 may cross-reference information corresponding to the user's preference for the actor Chevy Chase against the identity of Chevy Chase, as identified by control circuitry 304 above as an entity of image 508.

Process 600 may then continue to 612, where control circuitry 304 determines whether the counter equals the number of n portions in image 508. If the counter i does not equal n, then process 600 may loop back to 610 after incrementing counter i by one. If the counter i does equal n, then process 600 may continue to 614, where control circuitry 304 may identify a preferred entity based on the cross-referencing. For example, control circuitry 304 may determine that of Joel McHale, Chevy Chase, and Ken Jeong depicted in image 508, where image 508 represents the media asset "Community," the user of user equipment 500 prefers Chevy Chase.

Process 600 may then continue to 616, where control circuitry 304 may generate for display the respective portion comprising the preferred entity. For example, the media guidance application illustrated in FIG. 5 may cause image portion 504 that is depicted next to media asset identifier 502 to be a cropped portion of image 508 that includes an entity that the user of user equipment 500 prefers. Following the "Community" example above, control circuitry 304 may crop a portion of image 508 that includes Chevy Chase, but does not include Joel McHale or Ken Jeong, and generate for display that cropped portion as image portion 504. In this manner, control circuitry 304 may cause the media guidance application running on user equipment 500 to be personalized to a user such that portions of art corresponding to a given media asset identifier 502 are displayed in image 504, instead of full image 508 which includes entities that the user is not interested in.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

FIG. 7 is a flowchart of illustrative steps involved in determining which portion of an image to generate for display based on a level of prevalence of an identity of an entity in a media asset, in accordance with some embodiments of the disclosure. It should be noted that process 700 or any step thereof could be performed on, or provided by, any of the devices shown in FIGS. 3-5. For example, process 700 may be executed by control circuitry 304 (FIG. 3) as instructed by control circuitry implemented on user equipment 402, 404, and/or 406 (FIG. 4) in order to determine which portion of an image to generate for display. In addition, one or more steps of process 600 may be incorporated into or combined with one or more steps of any other process or embodiment, such as those described in FIG. 6 and FIG. 8.

Process 700 begins at 702, control circuitry (e.g., control circuitry 304) may identify an image corresponding to a media asset, where the image comprises a plurality of portions, and where each portion of the plurality of portions comprises a respective entity. For example, control circuitry 304 may determine that media asset identifier 502 corresponds to the media asset "Community," which is a comedy series starring actors Joel McHale, Ken Jeong, and Chevy Chase. Control circuitry 304 may identify an image (e.g., image 508) that corresponds to the media asset "Community." Control circuitry 304 may identify image 508 by cross-referencing a database (e.g., media guidance data source 418, accessed by way of communications network 414)) that includes entries corresponding to media asset metadata. Image 508 may include a plurality of portions, where each portion includes a respective entity. For example, image 508 may correspond to the media asset "Community," and may include depictions of Joel McHale, Chevy Chase, and Ken Jeong, which are respective entities of three different portions of image 508. Process 700 may continue to 704.

At 704, control circuitry 304 may determine an identity of each respective entity in each respective portion of the plurality of portions. Control circuitry 304 may determine the entity by using any known mechanism. As an example, control circuitry 304 may determine the identity of Chevy Chase in image 508 by accessing metadata corresponding to image 508 and determining therefrom that Chevy Chase is depicted in a certain part of image 508. As another example, control circuitry 304 may utilize image recognition technology (e.g., facial recognition technology), where control circuitry 304 recognizes unique characteristics of each entity, and then cross-references those unique characteristics against a database (e.g., storage 306) to find an entity that matches the characteristics. Process 700 may then continue to 706.

At 706, control circuitry 304 may access a database to determine a level of prevalence of each identity in the media asset. Control circuitry 304 may determine the level of prevalence in any manner described above and below, such as by determining an amount of screen time in the media asset for each identity. For example, control circuitry 304 may determine that Joel McHale has 14 minutes of screen time, Ken Jeong has 3 minutes of screen time, and Chevy Chase has 1 minute of screen time, in an episode of "Community." Process 700 may then continue to 708.

At 708, control circuitry 304 may determine which respective entity corresponds to a highest level of prevalence. Control circuitry 304 may do this, for example, by comparing each level of prevalence against one another to determine the largest level of prevalence. Following from the example above regarding screen time, because Joel McHale has the longest amount of screen time in a given episode of "Community," control circuitry 304 will determine that Joel McHale corresponds to a highest level of prevalence. Process 700 may then continue to 710.

At 710, control circuitry 304 may generate for display a respective portion comprising the respective entity that corresponds to the highest level of prevalence. Following from the example above, control circuitry 304 may generate for display (e.g., at image portion 504) the portion comprising Joel McHale of image 508.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

FIG. 8 is a flowchart of illustrative steps involved in selectively generating for display an image of a plurality of images where a user-preferred entity is most prevalent, in accordance with some embodiments of the disclosure. It should be noted that process 800 or any step thereof could be performed on, or provided by, any of the devices shown in FIGS. 3-5. For example, process 800 may be executed by control circuitry 304 (FIG. 3) as instructed by control circuitry implemented on user equipment 402, 404, and/or 406 (FIG. 4) in order to determine which portion of an image to generate for display. In addition, one or more steps of process 800 may be incorporated into or combined with one or more steps of any other process or embodiment, such as those described in FIG. 6 and FIG. 7.

Process 800 beings at 802, where control circuitry (e.g., control circuitry 304) may identify a plurality of images corresponding to a media asset, where each image of the plurality of images comprises at least one portion, and where each portion comprises a respective entity. For example, control circuitry 304 may identify multiple images corresponding to "Community," where one image corresponds to Joel McHale, one image corresponds to Chevy Chase, and one image includes all of Joel McHale, Chevy Chase, and Ken Jeong. Process 800 may then continue to 804.

At 804, control circuitry 304 may determine an identity of each respective entity. Control circuitry 304 may determine the identity using any manner described above and below, such as image recognition techniques or an analysis of metadata associated with the image to determine the identity. Process 800 may then continue to 806.

At 806, control circuitry 304 may access a user profile from a database. Control circuitry 304 may access the user profile in any manner described above and below, such as by accessing a database at media guidance data source 418 by way of communications network 414. Process 800 may then continue to 808.

At 808, control circuitry 304 may cross-reference metadata of the user profile with each identity of each respective identity. The cross-referencing of the metadata of the user profile with each identity of each respective entity may be performed consistent with any manner described above and below. The cross-referencing of metadata with of the user profile with each identity of each respective identity may yield information about a user's preferences with each identity. Process 800 may then continue to 810.

At 810, control circuitry 304 may identify a preferred entity based on the cross-referencing. For example, control circuitry 304 may determine that the user prefers supporting cast comedians, such as Chevy Chase, and does not prefer the main character Joel McHale. Process 800 may then continue to 812.

At 812, control circuitry 304 may determine an image of the plurality of images where the preferred entity is most prevalent. Following from the example above, control circuitry 304 may determine that there is an image that includes only Chevy Chase, and another image including Chevy Chase, Joel McHale, and Ken Jeong. Control circuitry 304 may determine that the image including only Chevy Chase is an image where Chevy Chase is most prevalent. Process 800 may then continue to 814, where control circuitry 304 may generate for display the image including only Chevy Chase.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 8.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determination which portion of image 508 to generate for display may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the media asset correspondences as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for selectively generating for display portions of an image based on a user profile, the method comprising:
identifying an image corresponding to a requested media asset, wherein the image comprises a plurality of portions, and wherein each portion of the plurality of portions comprises a respective depiction of a person;
determining an identity of each respective person in each respective portion of the plurality of portions;
generating an affinity ranking for each respective person based on a user profile;
identifying each combination of two or more of the portions of the image to generate a plurality of subsets of portions of the image;
calculating a combined affinity ranking for each respective subset based on the affinity ranking of each person depicted by the respective subset;
identifying a preferred subset with a highest combined affinity ranking;
determining whether the preferred subset comprises two non-adjacent portions of the plurality of portions;
in response to determining that the preferred subset comprises two non-adjacent portions of the plurality of portions:
cropping out each of the two non-adjacent portions; and
stitching the cropped non-adjacent portions together to generate a stitched image; and
generating for display, the stitched image.

2. The method of claim 1, wherein determining the identity of each respective person depicted in each respective portion of the plurality of portions comprises performing facial recognition on each respective depiction of a person of the image.

3. The method of claim 1, further comprising:
recognizing textual content in the image; and
generating for simultaneous display the textual content with the subset with the highest combined affinity ranking.

4. The method of claim 1, further comprising:
determining characteristics of the subset with the highest combined affinity ranking;
determining, based on the characteristics of the subset with the highest combined affinity ranking, optimal characteristics for features surrounding the subset with the highest combined affinity ranking in the respective portion; and
altering characteristics of the features surrounding the subset with the highest combined affinity ranking to reflect the optimal characteristics.

5. A system for selectively generating for display portions of an image based on a user profile, the system comprising:
control circuitry configured to:
identify an image corresponding to a requested media asset, wherein the image comprises a plurality of portions, and wherein each portion of the plurality of portions comprises a respective depiction of a person;
determine an identity of each respective person in each respective portion of the plurality of portions;
generate an affinity ranking for each respective person based on a user profile;
identify each combination of two or more of the portions of the image to generate a plurality of subsets of portions of the image;
calculate a combined affinity ranking for each respective subset based on the affinity ranking of each person depicted by the respective subset;
identify a preferred subset with a highest combined affinity ranking;
determine whether the preferred subset comprises two non-adjacent portions of the plurality of portions;
in response to determining that the preferred subset comprises two non-adjacent portions of the plurality of portions:
crop out each of the two non-adjacent portions; and
stitch the cropped non-adjacent portions together to generate a stitched image; and
generate for display, the stitched image.

6. The system of claim 5, wherein determining the identity of each respective person depicted in each respective portion of the plurality of portions comprises performing facial recognition on each respective depiction of a person of the image.

7. The method of claim 5, further comprising:
recognizing textual content in the image; and
generating for simultaneous display the textual content with the subset with the highest combined affinity ranking.

8. The method of claim 5, further comprising:
determining characteristics of the subset with the highest combined affinity ranking;
determining, based on the characteristics of the subset with the highest combined affinity ranking, optimal characteristics for features surrounding the subset with the highest combined affinity ranking in the respective portion; and
altering characteristics of the features surrounding the subset with the highest combined affinity ranking to reflect the optimal characteristics.

9. A non-transitory computer readable medium having instructions encoded thereon, that when executed by control circuitry causes the control circuitry to:
identify an image corresponding to a requested media asset, wherein the image comprises a plurality of portions, and wherein each portion of the plurality of portions comprises a respective depiction of a person;
determine an identity of each respective person in each respective portion of the plurality of portions;
generate an affinity ranking for each respective person based on a user profile;
identify each combination of two or more of the portions of the image to generate a plurality of subsets of portions of the image;
calculate a combined affinity ranking for each respective subset based on the affinity ranking of each person depicted by the respective subset;
identify a preferred subset with a highest combined affinity ranking;
determine whether the preferred subset comprises two non-adjacent portions of the plurality of portions; and
in response to determining that the preferred subset comprises two non-adjacent portions of the plurality of portions:

crop out each of the two non-adjacent portions; and
stitch the cropped non-adjacent portions together to generate a stitched image; and
generate for display, the stitched image.

10. The non-transitory computer-readable medium of claim 9, wherein, wherein determining the identity of each respective person depicted in each respective portion of the plurality of portions comprises performing facial recognition on each respective depiction of a person of the image.

11. The non-transitory computer-readable medium of claim 9, wherein the instructions further comprise:
recognizing textual content in the image; and
generating for simultaneous display the textual content with the subset with the highest combined affinity ranking.

12. The non-transitory computer-readable medium of claim 9, wherein the instructions further comprise:
determining characteristics of the subset with the highest combined affinity ranking;
determining, based on the characteristics of the subset with the highest combined affinity ranking, optimal characteristics for features surrounding the subset with the highest combined affinity ranking in the respective portion; and
altering characteristics of the features surrounding the subset with the highest combined affinity ranking to reflect the optimal characteristics.

\* \* \* \* \*